(12) United States Patent
Song et al.

(10) Patent No.: US 6,450,259 B1
(45) Date of Patent: Sep. 17, 2002

(54) TUBING ELONGATION CORRECTION SYSTEM & METHODS

(75) Inventors: Haoshi Song, Sugar Land; David E. Rios-Aleman, Houston, both of TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/071,279

(22) Filed: Feb. 8, 2002

Related U.S. Application Data
(60) Provisional application No. 60/269,280, filed on Feb. 16, 2001.

(51) Int. Cl.$^7$ ............................................. E21B 47/09
(52) U.S. Cl. ................................................... 166/255.1
(58) Field of Search ........................ 166/64, 77.2, 243, 166/244.1, 250.01, 255.1; 175/40, 45, 48

(56) References Cited

U.S. PATENT DOCUMENTS

| | | | |
|---|---|---|---|
| 4,577,410 A | * | 3/1986 | Ritter |
| 5,202,680 A | * | 4/1993 | Savage |
| 5,351,531 A | * | 10/1994 | Kerr |
| 6,055,213 A | * | 4/2000 | Rubbo et al. |

\* cited by examiner

Primary Examiner—Roger Schoeppel
(74) Attorney, Agent, or Firm—Conley, Rose & Tayon, P.C.

(57) ABSTRACT

A surface processor uses an environmental profile to determine the sub-surface length of tubing disposed in a well bore. Information relating to tubing properties is stored in a memory module of the surface processor. The environmental profile includes data relating to well bore ambient conditions and the operating parameters of well equipment. Surface processor calculates the tubing elongation or length reduction corresponding to the environmental profile. Surface processor may repeat this process to develop a measured depth chart for a well. Logging operations performed in conjunction with the sub-surface length calculations allows formation data to be associated with the measured depth chart.

21 Claims, 6 Drawing Sheets

TUBING ELONGATION CORRECTION SYSTEM & METHODS

CROSS-REFERENCE TO RELATED APPLICATIONS

This application is related to application Ser. No. 09/081,961, filed May 20, 1998 and entitled "Well System," now U.S. Pat. No. 6,296,066 which is hereby incorporated by reference. Further, this application claims the benefit of provisional application Ser. No. 60/269,280 filed Feb. 16, 2001 and entitled "Length Correction System and Methods," which is also hereby incorporated by reference.

STATEMENT REGARDING FEDERALLY SPONSORED RESEARCH OR DEVELOPMENT

Not Applicable.

BACKGROUND OF THE INVENTION

1. Field of the Invention

The present invention relates to a system for determining the drilled distance between the surface and a point in a well bore. More particularly, the present invention relates to a system using a processor that calculates true measured depth based on data received from surface sensors, downhole sensors, and in another aspect, the present invention relates to a method for using a tubular umbilical to determine the drilled distance between the surface and a point in a well bore. More particularly, the present invention provides a method for correcting a surface-measured length of a tubular umbilical to determine the sub-surface length of the tubular umbilical by using an environmental profile to calculate length corrections. Still more particularly, the present invention relates to methods using temperature differentials, pressure differentials and axial loadings to correct a surface-measured length of a composite coiled tubing umbilical to determine the corresponding sub-surface length of the umbilical.

2. Background of the Invention

Successful hydrocarbon recovery operations are often founded on the ability to accurately log the trajectory of a drilled well bore extending hundreds or even thousands of feet below the surface of the earth. Accurate depth measurements can play an important, if not pivotal, role in such hydrocarbon recovery operations. Referring now to FIG. 1, "measured depth" (MD) is defined as a drilled distance between a surface point $P_o$ and consecutive points $P_1, P_2 \ldots P_n$. In contrast, true vertical depth (TVD) is the distance between a point P and the surface point $P_O$ as measured on a vertical plane. Both MD and TVD are important for proper log data correlation. Because MD provides a basis for reference points along a drilled well bore, formation properties are often linked to accurate MD logs. With measurement-while-drilling (MWD) instrumentation, formation data such as gamma emissions and resistivity may be surveyed while a well bore is drilled. By logging the MD in conjunction with MWD surveys, formation data can be given a physical location with respect to the well bore trajectory. Once a well bore has been completed, a log for the well bore would show the formation properties at each MD. Such formation data can be used to determine which layers of formation are likely to hold hydrocarbon deposits. For example, it may be that the well log indicates that a gas layer exists at point $P_{i-1}$, an oil layer exists at point $P_i$ (a "pay zone"), and a water layer exists at point $P_{i+1}$. Because oil is far more profitable to recover than gas, well owners often wish to drain the oil layer without disturbing the gas deposits above the oil. This is even more the case with water layers because recovery of water is rarely, if ever, profitable. Moreover, it is usually very undesirable to inadvertently drain a gas or water layer because these fluids tend to flood a well to such a degree that a well remains nonfunctional until all the water or gas has been evacuated from the well. Further compounding the inherent difficulties in this situation is that, in many instances, a pay zone may be less than fifty feet in a well bore that may be thousands of feet in length. Therefore, it is important that well owners obtain well logs having accurate measured depths for subterranean formations in order to drain a pay zone without disturbing adjacent layers.

Further, regulatory authorities often require that owners of wells keep detailed formation survey information. Inaccurate data could lead to unintended violations of regulatory rules and subject the well owner to fines or other penalties. Therefore, accurate MD logs provide the well owner with the information needed to comply with the rules governing drilling activities.

Obtaining accurate MD logs is usually a fairly straightforward process for wells using drill string made up of conventional steel pipe or steel coiled tubing. For conventional steel pipe, the individual joints making up the pipe string are of a known length. Thus, an operator needs only keep count of the number of joints making up the pipe string. For example, referring to FIG. 1, if one hundred joints, each thirty feet in length, span between point $P_o$ and point $P_i$, then the MD at point $P_i$ is 3000 feet. Similarly, when steel coiled tubing 20 is used, the length of steel coiled tubing 20 payed out from a reel 22 on the surface represents the MD. Often, the length of steel coiled tubing is measured as a function of the number of revolutions made by a friction wheel (not shown); coiled tubing length may be also measured by other commercially available line payout devices. For example, referring to FIG. 1, a dial (not shown) on reel 22 may indicate that 3000 feet of steel coiled tubing 20 was payed out between points $P_o$ and $P_i$. Thus, the dial indicates a MD of 3000 feet at point $P_i$. In either of the above instances, as long as the surface measurements are taken properly, the MD should also be accurate. It should be understood that the examples discussed are merely illustrative and to not represent expected depth values or measurement accuracy.

While these prior art MD survey techniques may be reliable for tubing formed of metals such as steel, however, such techniques do not give accurate logs for tubulars made of materials such as composites. Composite materials for coiled tubing are discussed in pending application Ser. No. 09/081,961, filed May 20, 1998 and entitled "Well System," which is hereby incorporated by reference. Tubulars made of non-metals, such as composites, are susceptible to significant length changes due to factors such as temperature, pressure and axial loadings. Unfortunately, elevated temperatures, high operating pressures and complex compression and tension loadings are almost always present in a well bore environment. Thus, a length of composite coiled tubing on the surface may expand or contract as it enters a well bore. For example, a surface-measured length at reel 22 may indicate that 3000 feet of composite coiled tubing was payed out at point $P_i$. However, the composite coiled tubing umbilical may have expanded to 3050 feet due to well bore conditions. Accordingly, the actual drilled depth at point $P_i$ would be 3050 feet, not 3000 feet. An uncorrected MD log can present serious problems in later operations when equipment such as perforation charges are tripped downhole to initiate the drainage of a pay zone at $P_i$. Since this equipment is run in on a wireline or other device that is not subject to the same type or degree of expansion, the charge would be set at 3000 feet instead of 3050 feet, and possibly within the gas layer at $P_{i-1}$. Indeed, even during successive composite coiled tubing trips for the same operation, downhole conditions can vary to a point where it may be difficult to correlate logs of these successive trips. Despite the critical need for accurate MD logs, the prior art does not disclose systems or methods that correct surface measurements of tubulars made of materials that deform when exposed to environmental factors.

BRIEF SUMMARY OF SOME OF THE PREFERRED EMBODIMENTS

The present invention features a system and method for determining a sub-surface length of tubulars made of materials that deform when exposed to environmental factors. The sub-surface length of the tubing generally represents the measured depth. For a well having a composite coiled tubing umbilical extending from the surface to a bottom hole assembly in a well bore, an embodiment of a preferred system includes a surface processor, surface sensors, downhole sensors and a telemetry system. The surface processor includes software that determines an environ-mental profile for the tubing using the environmental data retrieved by the downhole and surface sensors. By applying the environmental profile to the surface-measured length of the tubing umbilical, the computer software calculates the sub-surface length of the tubing umbilical.

An embodiment of the software includes a memory module, a monitoring module, and a calculating module. Calculated values, as well as data relating to tubing properties, well trajectory and other constant values, are stored in the memory module. The monitoring module receives temperature, pressure and tension information, and well surveys from downhole and surface sensors via the telemetry system. The calculating module determines the sub-surface tubing umbilical length by retrieving the relevant information from the memory module and monitoring module. A preferred calculating module determines tubing umbilical length changes due to temperature differentials, hydraulic pressure differentials, and axial loadings on the tubing umbilical.

Another embodiment of the present invention includes logging while-drilling (LWD) package operated in conjunction with the preferred system. The LWD package logs formation properties such as gamma radiation and resistivity. A preferred system couples the logged formation data information to the calculated sub-surface tubing length. In still another embodiment, the present invention is deployed in conjunction with a casing collar or joint locator device that provides an accurate length measurement of distance traveled in a cased portion of a well bore. The measurements of the casing collar joint locator or similar device are used to verify or calibrate the calculations of the present invention.

Thus, the present invention comprises a combination of features and advantages that enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENT

Figure 1:
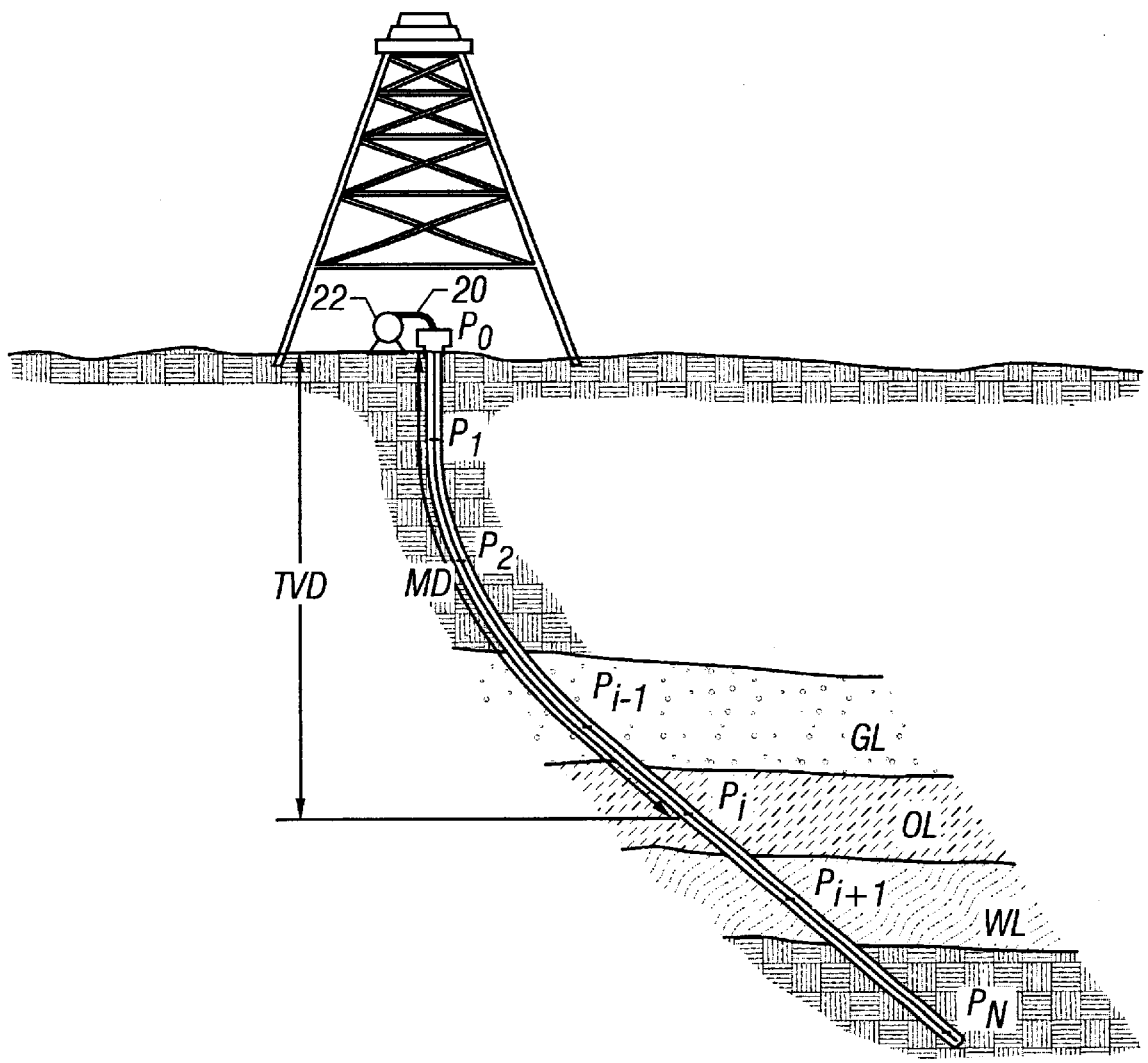
FIG. 1 is a schematic drawing showing a well having a deviated bore through a subterranean formation.
Figure 2:
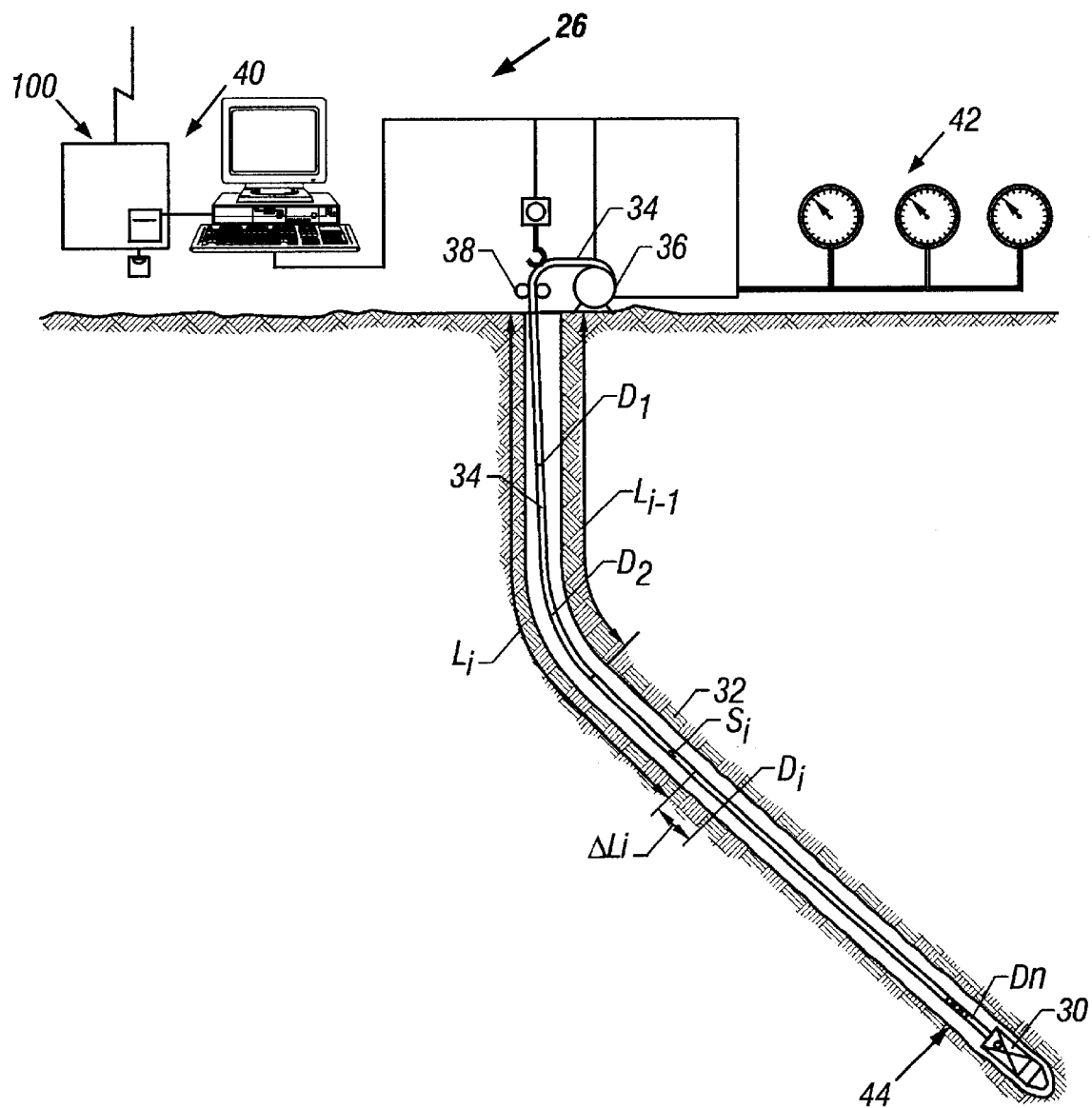
FIG. 2 is a schematic drawing showing a depth measurement system constructed in accordance with a preferred embodiment of the present invention.

The preferred embodiments comprise a system and method for obtaining an accurate measured depth (MD) by correcting a measured length of a tubular conduit disposed in a well. According to a preferred embodiment of the present invention, the MD is established by correcting a surface measurement of the length of a tubular member such as composite coiled tubing by accounting for axial deformation due to an environmental profile of the well. The term "environmental profile" generally refers to the various ambient well conditions and loadings imposed by well equipment along the trajectory of a well bore. These conditions and loadings are inherent in subterranean well operations. "Tubing" as used hereinafter refers to any tubular member that is susceptible to length changes when subjected to environmental factors. Moreover, the terms "tubing," "coiled tubing" and "umbilical" are used interchangeably. Referring now to FIG. 2, a bottom hole assembly (BHA) 30 is shown in a drilled well bore 32. A composite coiled tubing umbilical 34 extends from reel 36 to BHA 30. As BHA 30 progresses through well bore 32, MD readings are taken to determine the location of BHA 30. A first depth at which a MD is taken is designated as depth $D_1$, a second point at which a MD reading is taken is designated as depth $D_2$, etc. During drilling, the approximate physical location of BHA at any time is designated as depth $D_n$. Thus, depth $D_n$ represents a current location of BHA 30, whereas depths $D_1$ through $D_{n-1}$ represent previous locations of BHA 30.

In order to better describe the utility of the preferred embodiments, a depth point is designated as depth $D_i$. Depth $D_i$ represents any point between depth $D_1$ and depth $D_n$ along a well bore trajectory. The surface-measured length of tubing umbilical 34 payed out at depth $D_i$ is designated as $L_i$. Length $L_i$ is usually determined by a friction wheel (not shown) that spins when engaging coiled tubing that is being injected downhole. However, the surface-measured length $L_i$ may not be the true drilled depth at depth $D_i$. The environmental profile of the well may have caused tubing umbilical 34 to elongate or shrink. Thus, the sub-surface length of tubing umbilical 34 is the surface-measured length $L_i$ plus the amount of shrinkage or elongation.

Referring still to FIG. 2, a preferred system 26 for correcting the measured depth to reflect the actual drilled depth includes a computer 40, surface sensors generally designated as numeral 42, downhole sensors generally designated as numeral 44, and a downhole telemetry system (not shown). The sensors discussed herein are well known in the industry. Accordingly, the sensors will be discussed only briefly and are shown schematically in FIG. 2. Preferably, surface sensors 42 include a flowmeter and a pressure transducer at a drilling mud pump (not shown), a temperature sensor, a tension meter at tubing injector 38, a length payout sensor such as a friction wheel (not shown) at reel 36 and a viscometer. Downhole sensors 44 proximate to BHA 30 preferably include a pressure transducer, a temperature sensor, a tension sub, an inclination sensor and an azimuth sensor.

Computer 40 comprises a memory module (not shown) and a calculating module (not shown). The memory module includes a survey file (not shown). The survey file is preferably structured to store data such as the temperature, the azimuth and the inclination of the well bore at a particular depth $D_i$. Thus, an exemplary entry in a survey file may include a depth (D), an azimuth value (azi), an inclination value (inc), and a temperature (Te). The survey file is preferably organized to store data at periodic depth intervals (e.g., every twenty feet).

Computer 40 receives data through manual entry or by communication links to downhole and surface sensors. Downhole telemetry system (not shown) communicates readings from downhole sensors 44 to computer 40. Surface measured parameters such as pump flowrate, pump pressure, mud density ("mud weight") and surface temperature may be manually read and entered into computer 40. Alternatively, computer 40 may be directly linked to surface sensors measuring these parameters. Other parameters such as drilling mud density, well bore geometry and tubing geometry are preferably entered manually into computer 40. Preferably, measurements relating to open hole diameter are entered automatically. In either instance, computer 40 writes the acquired data to the memory module.

Figure 3:
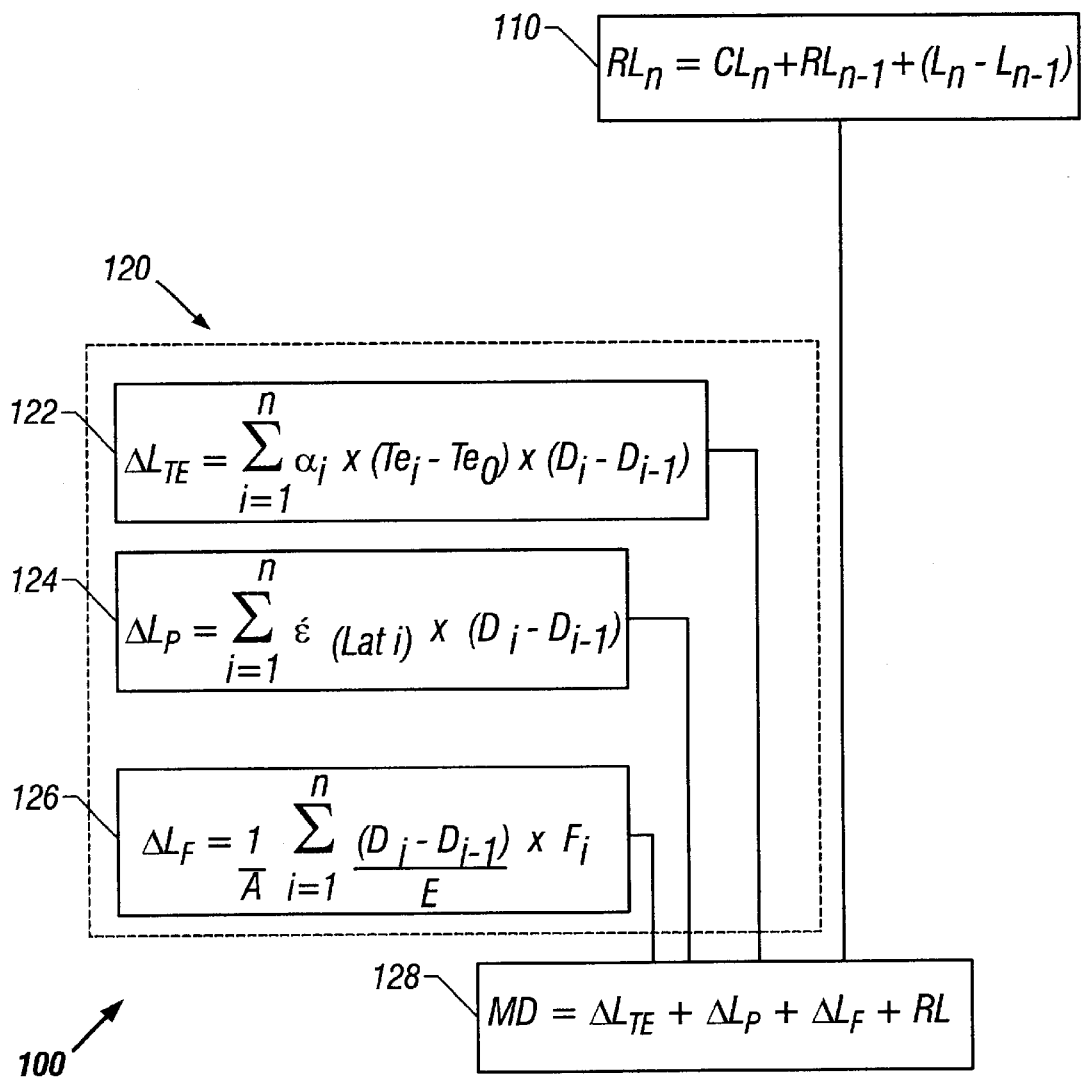
FIG. 3 is a block diagram representing a preferred length correction method used in conjunction with a depth measurement system constructed in accordance with a preferred embodiment of the present invention.

Referring now to FIGS. 2 and 3, to find a measured depth (MD) at depth $D_i$, the calculating module of computer 40 includes a preferred correction method 100 that accounts for length changes due to one or more of the following factors: thermal expansion, differential pressure, hydraulic flow and tension/compression (i.e., axial loadings). Method 100 uses a first routine 110 for calculating a reference length $RL_j$ and a second routine 120 for determining correction length to determine MD. Reference length $RL_j$, a theoretical "base line" length discussed below, is preferably calculated at pre-determined time intervals (e.g., every 30 seconds). Depth $D_i$, which is a specific location along the well bore trajectory, is preferably calculated at pre-determined distances (e.g., every twenty feet).

Reference length $RL_j$ provides a pre-determined and arbitrary reference point from which measured depth calculations can be made. Coiled tubing at the surface, prior to injection, is already exposed to factors such as ambient temperature (e.g., the temperatures of air and drilling fluid) and the hydraulic pressure of drilling fluid. The coiled tubing can also be exposed to axial forces (tension) induced by a number of elements including the operation of the injector, stripper, and tractor and tubing and BHA weight. These environmental factors will often change during well servicing operations and lengthen or shorten the tubing introduced into the well bore. Thus, two sections of coiled tubing, while having the same length when exposed to the same environmental profile, will cause a depth wheel to indicate different surface-measured lengths $L_j$ if there are differences in the environmental factors when these two coiled tubing sections are injected into the well bore. Routine 110 minimizes the errors caused by variation in surface environmental factors by converting all the surface-measured lengths L to theoretical reference lengths RL.

Figure 4:
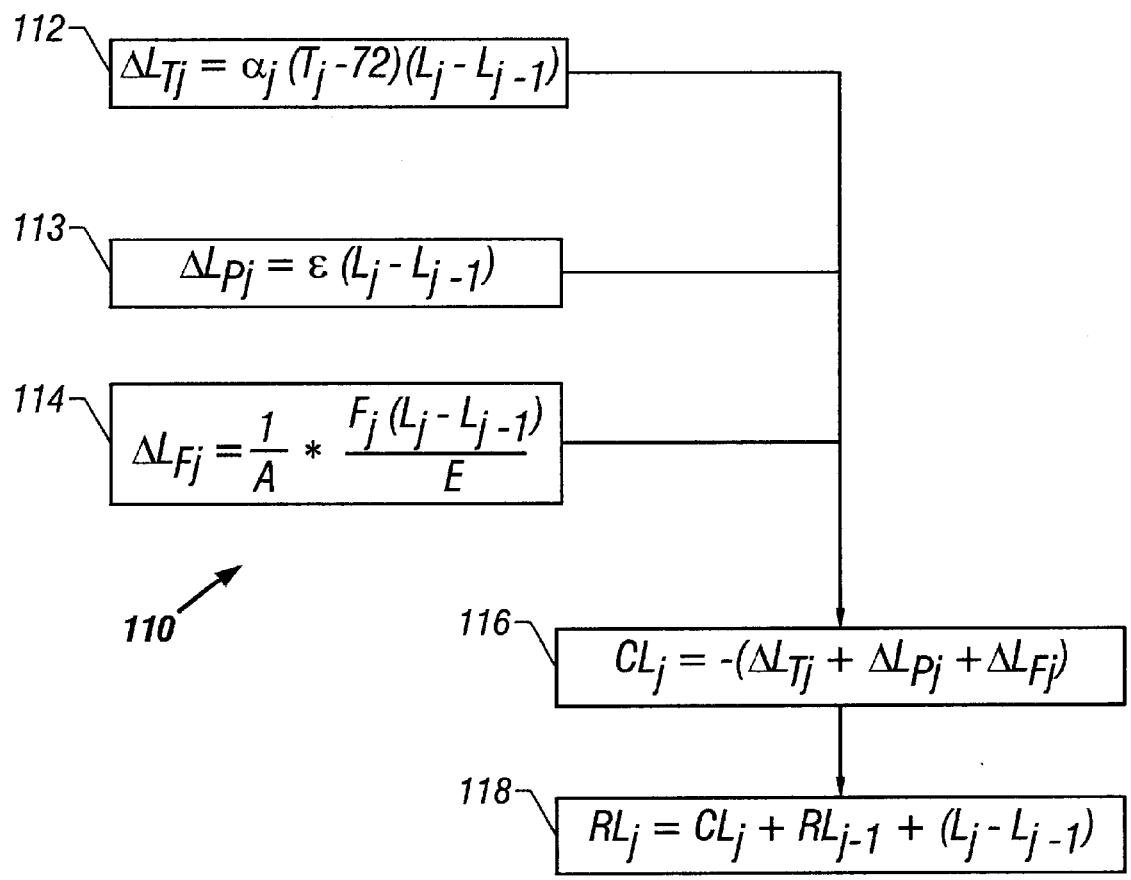
FIG. 4 is a block diagram representing a preferred routine for converting a surface-measured length to a reference length as used in conjunction with the preferred length correction method.

Referring now to FIG. 4, there is shown a preferred routine 110 for converting a surface-measured length $L_j$ into an associated reference length RL. Reference length $RL_j$ represents the calculated length of a given coiled tubing segment S at a reference environmental profile (e.g., 72 degrees F, no axial loadings, no hydraulic pressure induced by drilling fluid). Length changes $\Delta L_T$, $\Delta L_P$, and $\Delta L_F$, are calculated at steps 112, 113, and 114, respectively and summed to obtain $CL_j$, a corrected length difference, at step 116. These length changes are attributable to the differences in temperatures, pressures and axial loads between the surface and reference environmental profiles. For step 112, $T_j$ may be temperature of air, drilling fluid or any other heat/cooling source that may affect the coiled tubing. For step 113, $P_j$ is the total pressure differential seen by the tubing; i.e, the system pressure drop below the measuring point. For step 114, $F_j$ represents the axial force imposed on the coiled tubing as measured by a surface tension meter. Reference length $RL_j$ is calculated at step 118 by summing the length difference CL, the reference length of the previous segment ($RL_{j-1}$), and the difference between the surface-measured lengths of two successive coiled tubing segments ($L_j - L_{j-1}$). The other aspects of the FIG. 3 calculations, such as the material constants (e.g., E) are discussed in detail below.

Referring back to FIG. 3, preferred correction method 100 calculates the collective length changes caused by temperature $\Delta L_{Te}$, pressure $\Delta L_P$ and axial loading $\Delta L_F$ in routine 120. Exemplary summation equations for changes in length due to temperature, pressure and axial loading (tension) are shown at blocks 122, 124 and 126, respectively. As can be appreciated, the exemplary equations use a finite element analysis to determine length changes of tubing umbilical 34. That is, tubing umbilical 34 is modeled as constructed of a number of segments defined by the depth values $D_i$ in the survey file. Thus, to determine the length of an exemplary segment $S_i$ between depths $D_i$ and $D_{i-1}$, routine 110 references the survey file depth value entries corresponding to these points (e.g., $D_i$ and $D_{i-1}$). At step 130, these length changes are added to the reference length RL to determine the measured depth $MD_n$, or $D_n$.

Referring still to FIG. 3, block 122 illustrates an exemplary summation for finding the total thermal elongation $\Delta L_{Te}$ at depth $D_n$. The summation includes the length changes due to temperature differentials for segments $S_1$ through $S_n$. For exemplary segment $S_i$, length change $\Delta L_{Tei}$ is calculated using a temperature at depth $D_i$ designated as $Te_i$, the reference environmental profile temperature $Te_o$ (e.g., 72° F.), the coefficient of thermal expansion of the tubing material $\alpha$, and the length of segment $S_i$ ($D_i - D_{i-1}$).

The thermal elongation calculations use both real time data and data stored in the memory module. For segment $S_n$, downhole sensors 44 proximate to BHA 30 provide the temperature at depth $D_n$. For the remaining segments, temperatures at points $P_1$ through $P_{n-1}$ are stored in the survey file of the memory module and retrieved during length change calculations.

Preferred correction method 100 accounts for the fact that the coefficient of thermal expansion $\alpha$ for composite materials changes with temperature. The relationship between $\alpha$ and temperature is usually provided by the manufacturer of the tubing material and, in any case, can be determined using empirical data found experimentally using methods well known in the art. Preferably, the computer memory module includes a look-up table that correlates temperature Te to a corresponding coefficient of thermal expansion $\alpha$. It should be noted that block 22 uses a survey file entry for $D_n$. The depth for this entry is not available. Accordingly, this depth may be estimated by reference to the previous depth reading.

Figure 5:
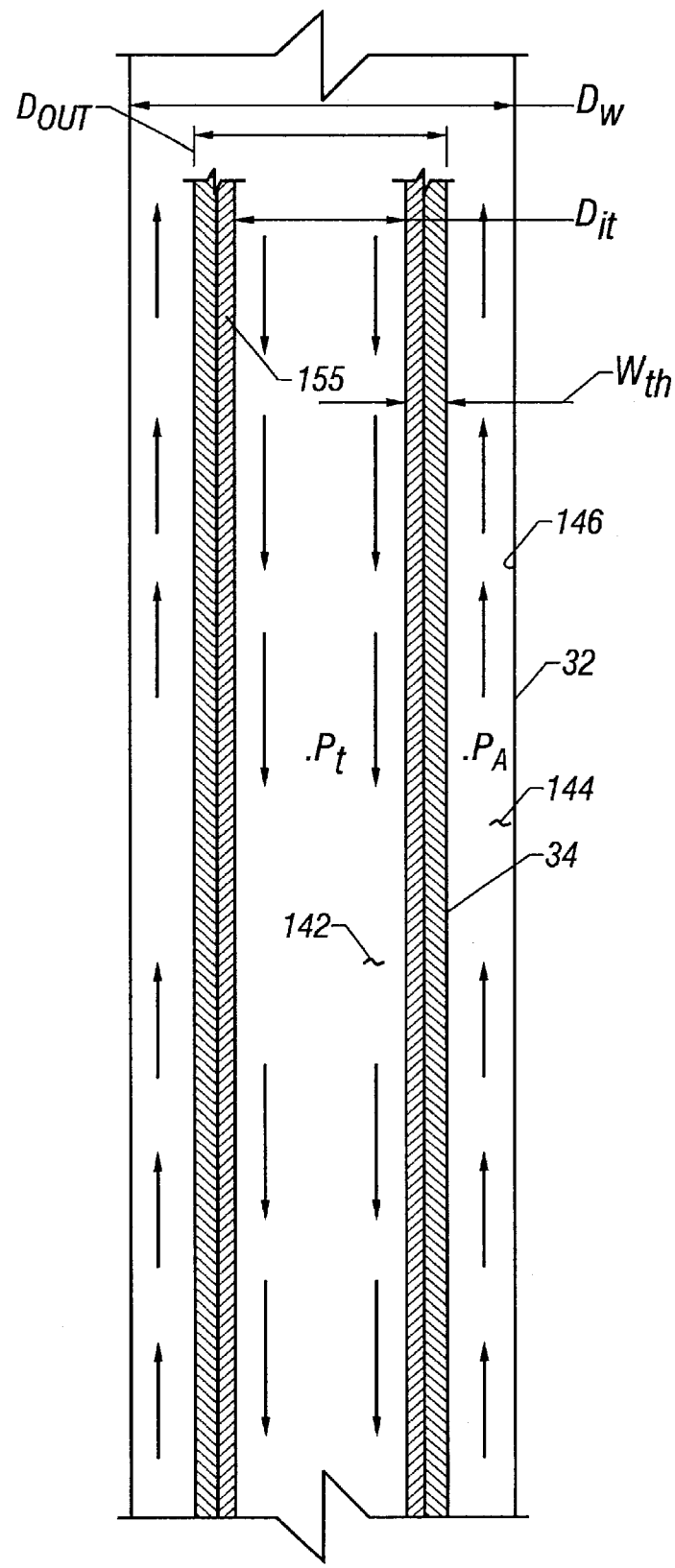
FIG. 5 is a cross-sectional view of an exemplary section of tubing transporting drilling fluid.

Referring still to FIG. 3, block 124 illustrates an exemplary summation for finding the total elongation $\Delta L_P$ at depth $D_n$ due to pressure differentials. Differential pressure in tubing umbilical 34 induces an axial strain that causes a change in tubing length. Referring now to FIG. 5, drilling fluid 142 is shown flowing downhole through tubing 34, and flowing uphole in an annulus 144 defined by tubing umbilical 34 and bore hole wall 146. Typically, pressure $P_t$ in the tubing umbilical 34 is greater than pressure $P_a$ in annulus 144. Pressure differential $\Delta P$ is the difference between the pressure inside the tubing umbilical 34 $P_t$ and the pressure in the annulus $P_a$. A positive pressure differential $\Delta P$ tends to expand tubing umbilical 34 radially. Radial expansion of tubing umbilical 34 causes a reduction in length in tubing umbilical 34. Procedures for calculating for length changes caused by pressure differentials in tubular members are well known in the art. Accordingly, the calculations described are merely illustrative of the general considerations in performing such calculations.

Pressure differential $\Delta P$ for segment $S_i$ is calculated using commercially available hydraulic fluid modeling applications/software. Referring now to FIGS. 3 and 5, typically, pressure differential $\Delta P$ calculations involve the measured density of the drilling fluid (known as "mud weight"), the pump pressure, downhole pressure at BHA, the viscosity of the drilling fluid, the diameter of well bore 32 ($D_w$), the outer diameter of tubing umbilical 34 ($D_{ot}$), and the inner diameter of tubing umbilical 34 ($D_{it}$). It should be noted that $D_w$ may be either the diameter of well bore 32 or the inside diameter of a well bore completion tubing (not shown) cemented in well bore 32. It should also be noted that a liner 155 may be installed inside tubing umbilical 34. In such instances, $D_{it}$ would be the inner diameter of the innermost liner. The calculation for pressure differential uses fluid mechanics solutions which are well known in the art. Moreover, software programs performing such calculations are available from a variety of commercial sources.

Preferably, a differential pressure sensor (not shown) at BHA 30 is used to check the accuracy of the pressure differential calculation. It will be appreciated that the above-described calculations will produce pressure differential values for each segment of coiled tubing umbilical 34, including the segment $S_n$ adjacent to BHA 30. Thus, the pressure drop for segment $S_n$ may be compared with the BHA differential pressure sensor reading. If the actual and calculated pressure differential values are within a prescribed tolerance, then it is likely that the hydraulic fluid modeling equations reliably predict the fluid flow within the coiled tubing umbilical 34. If there is considerable variance between the calculated and measured values, then a different set of fluid flow modeling equations (e.g., Power law, Bingham, Herschel-Buckley, Newtonian) may be used to calculate pressure differentials. Indeed, the calculating model may be programmed to sequence through a number of hydraulic modeling programs in order to find the modeling program that provides calculated pressure differential value for segment $S_n$ that best approximates the measured pressure differential for segment $S_n$.

Using the calculated pressure differential $\Delta P$, a Hoop Stress $\sigma$ corresponding to pressure differential $\Delta P$ for segment $S_i$ using pressure differential $\Delta P$ and tubing geometry can be found:

$$\sigma_{HOOP} = \frac{(D_{it})\Delta P}{2W_{th}}$$

Typically, this calculation requires the inner diameter of tubing 34 ($D_{it}$) and the wall thickness of tubing $W_{th}$. When a liner is installed inside tubing umbilical 34, $D_{it}$ would be the inner diameter of the innermost liner. Thereafter, an axial strain $\epsilon$ is calculated using the Hoop Stress $\sigma$:

$$\varepsilon_{lat} = -\upsilon \frac{\sigma_{HOOP}}{E}$$

Axial strain $\epsilon$ is calculated, in part, by using coiled tubing properties. It is known that the material properties of composites can change with temperature. Because temperature in well bore 34 can vary dramatically, the values for Young's Modulus and Poisson's Ratio are determined at the relevant ambient temperature. For example, the computer memory module may include a look-up table that correlates Young's Modulus and Poisson Ratio to temperature. With these factors considered, the change in length due to pressure differential is determined by a summation of the individual changes in length for segments $S_i$ to $S_n$.

Figure 6:
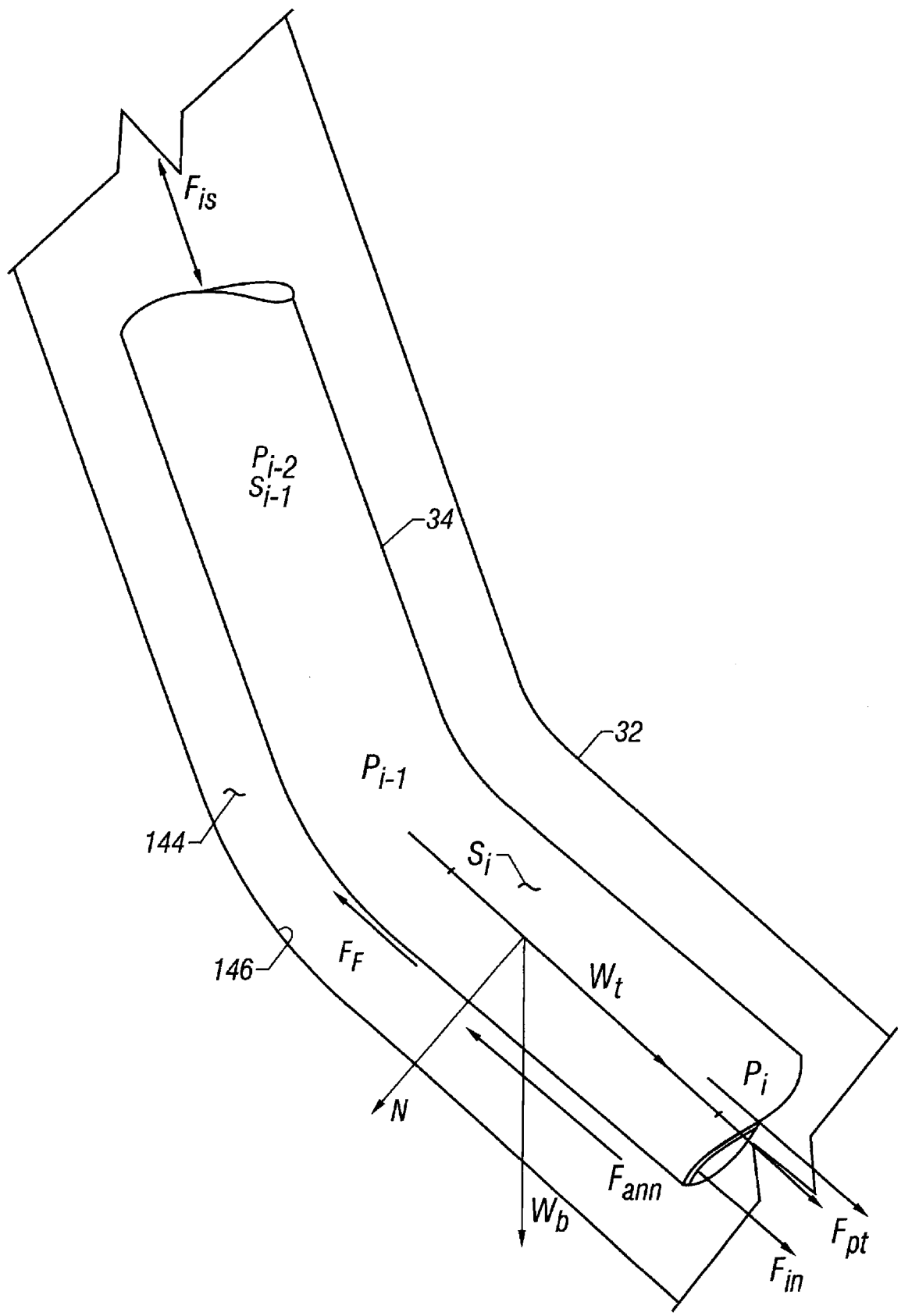
FIG. 6 is an enlarged side view of an exemplary section of tubing under axial loading.

Referring now to FIG. 6, there are several factors that affect the tension in exemplary tubing segment $S_i$: the mass of tubing segment $S_i$; the flow of drilling fluid in tubing segment $S_i$; sliding frictional force Fs, skin frictional forces $F_{in}$, $F_{ann}$, and the loadings caused by the tractor or injector. Preferred method 100 calculates the tension caused by the various factors for the coiled tubing segment closest to the surface and then calculates changes in the tension for each successive segment.

The mass of tubing defined by exemplary segment $S_i$ has a buoyant weight Wb that induces a change in tension in tubing umbilical 34. Weight $W_b$ of tubing is calculated for the volume of tubing segment $S_i$. Buoyancy must be considered because tubing umbilical 34 is immersed in drilling fluid. An exemplary equation for determining the force $F_w$ attributable to $W_b$ is as follows:

$$Fw = \frac{-W_b \cos\left(\frac{inc_i + inc_{i-1}}{2}\right)}{\cos\left(\frac{inc_i - inc_{i-1}}{2}\right)}$$

The values for inc are taken from the survey file entries in the memory module. It will be appreciated that the above equation accounts for non-vertical well bores.

Referring still to FIG. 6, drilling fluid flowing downhole through tubing umbilical 34 and uphole through annulus induces drag forces on the surfaces of tubing umbilical 34. The drag caused by drilling fluid flowing through tubing umbilical 34 tends to induce a tension in tubing umbilical 34 and is designated as $F_{bore}$. The drag caused by drilling fluid flowing through the annulus tends to induce a compressive force in tubing umbilical 34 and is designated as $F_{ann}$. Fluid drag forces $F_{bore}$ and $F_{ann}$ can be calculated using known fluid mechanics modeling. Exemplary calculations for determining drag forces based on pressure differentials along a given surface and the surface areas on which the pressure differentials act are as follows:

$F_{ann} = \pi/4 OD(\text{Hole}OD - OD_{tubing})(\Delta P_{ann})$ $F_{bore} = \pi/4 ID^2 (\Delta P_{tubingbore})$ Frictional force $F_f$ resists the sliding motion of composite coiled tubing umbilical 34. In addition to the normal component of $W_b$, the tension applied to the coiled tubing segment and effect of differential pressure also contribute to the normal force, or side force (RSF), related to frictional force $F_f$. Side force RSF has an inclination component, SFI, and an azimuth component, SFA. Exemplary calculations are as follows:

$$SFI = W_b * \sin(inc) - 2\left(F_{i-1} - \frac{\pi}{4}ID^2(dP_i)\right) *$$
$$\sin\left(\frac{inc_i - inc_{i-1}}{2}\right) - \Delta F_{i-1} * \sin\left(\frac{inc_i - inc_{i-1}}{2}\right)$$

$$SFA = \left(2*\left(F_{i-1} - \frac{\pi}{4}ID^2(dP_i)\right) * \sin\left(\frac{azi_i - azi_{i-1}}{2}\right) +$$
$$\Delta F_{i-1} * \sin\left(\frac{azi_i - azi_{i-1}}{2}\right)\right) * \sin(inc_i)$$

$$RSF = \sqrt{SFI^2 + SFA^2}$$

As can be seen, SFI accounts for the weight of the coiled tubing ($W_b$), the pressure differential (dP) and the change in tension ($\Delta F_{i-1}$). SFA accounts for the pressure differential (dP) and the change in tension ($\Delta F_{i-1}$). Frictional force $F_f$ is simply the RSF multiplied by the coefficient of friction $\mu$:

$$F_{fi}=tmf*\mu*RSF$$

Because the direction of frictional force $F_f$ depends on motion of composite coiled tubing, a trip mode factor (tmf) is used to assign the proper positive or negative value to $F_f$. If coiled tubing umbilical 34 is being pulled downhole, then tmf is assigned a positive value (i.e., +1) to denote that the frictional force tends to mitigate tension. If coiled tubing umbilical 34 is being pushed uphole, then tmf is assigned a negative value (i.e., −1) to denote that frictional force tends to mitigate compression.

The tension values may be used to determine the total change in tension for coiled tubing segment Si:

$$F_i=F_{i-1}+F_w+F_f-F_{bore}+F_{ann}$$

The above calculations are performed for each segment $S_i$. For the initial set of calculations, the coefficient of friction $\mu$ is preferably an assumed value of the coefficient of friction in the well. After this first iteration is complete, the calculated tension value for segment $S_n$ (i.e., $F_n$) the segment of coiled tubing closest to the BHA, is compared to the tension value as measured by the tension sub adjacent the BHA. If the calculated and measured tension values are within an specified tolerance, then $\mu$ is considered a reasonable estimate of the well bore coefficient of friction. If the calculated tension value is not acceptable, the $\mu$ is revised and the tension calculations are repeated for all the coiled tubing segments. This process is continued until the calculated and measured tension values are reasonably close.

Finally, the calculated $F_i$ is then used to calculate $\Delta L_F$:

$$\Delta L_F = \frac{1}{A}\sum_{i=1}^{n} F_i * \frac{(D_i - D_{i-1})}{E}$$

Thus, during operation, the first routine of the calculating module of the computer periodically a calculates reference lengths RL as BHA and connected coiled tubing umbilical 34 traverse a well bore. When the BHA reaches a predetermined depth interval, the second routine of the calculating module performs a finite element model analysis of the coiled tubing umbilical 34 in the well bore. Using measured and calculated environmental factors, the second routine calculates the measured depth of the BHA. The calculating module reports the measured depth and updates the survey file in the memory module with depth, temperature and well bore orientation data.

System 100 may be adapted to receive data either through manual entry or by direct communication links with surface and downhole sensors. Surface sensors measuring parameters such as surface-measured length of tubing, pump flowrate, pump pressure, hook load and surface temperature may be directly fed into a computer using known communication means. The viscosity and "mud weight" of the drilling fluid may be varied to accommodate drilling operations. While viscosity and "mud weight" may be directly fed into the computer, such variances are expected to be infrequent and may be better suited for manual entry. In addition, downhole sensors measuring tension, temperature and pressure may be linked to the computer via a telemetry system using wiring embedded in the walls of the tubing. Parameters such as well bore geometry and coil-tubing geometry are preferably entered manually into the computer. It should be understood that no particular sequence is necessary in the data retrieval or entry process. Nor is there a particular sequence necessary in the calculations of sub-surface tubing lengths. To the extent that sensor information is directly fed into the computer, the computer may include a monitoring module that retrieves data from the surface and downhole sensors.

Preferred system 100 may also be deployed with other depth measurement devices. For example, devices that locate joints or collars in cased well bores can provide accurate depth measurements. Casing collar locators and other similar devices are discussed in pending application Ser. No. 09/286,362 filed on Apr. 5, 1999, which is hereby incorporated by reference for all purposes. During workover operations, a BHA may traverse a span of cased well bore before forming a new lateral drainhole or well bore at a kick-off point. A casing collar locator, or similar device, may be used to definitively measure the sub-surface length of the tubing between the surface and the kick-off point. This definitive length may be compared with a calculated length of the tubing to calibrate well sensors or modify the calculation methodology.

In another embodiment, the preferred system and/or method may be used after a well has been drilled. For example, it may be determined that hydrocarbon deposits exist at measured depth $D_i$. In order to perform operations such as perforation at measured depth $D_i$, composite coiled tubing may be tripped downhole to convey the implements needed to perforate the well bore at depth i. Composite coiled tubing that is tripped downhole may be subject to the same well bore conditions and operating parameters that cause elongation during drilling. Thus, the preferred system could be employed to correct the surface measured length L in order to convey implements to depth $D_i$. In this embodiment, the preferred system is used as a guidance tool.

In still another embodiment, the present length correction system or method may be utilized in a three dimensional (3D) steering system. Prior to well construction activities, operators typically conduct numerous geological studies of prospective subterranean formations. Seismic testing, well logging, and other reservoir description techniques are used to identify and define hydrocarbon reservoirs. Such testing may suggest that a 3D well bore trajectory can maximize exposure of a well bore to a hydrocarbon deposit and/or intersect two or more hydrocarbon deposits or layers. To implement a 3D well bore, a 3D well bore trajectory is first developed based on the information provided by known reservoir description techniques. The 3D well bore trajectory is then digitally mapped and inputted into a memory module of a general purpose computer. During drilling operations, the true measured depth as provided by the length correction method, in conjunction with azimuth and inclination readings provided by BHA sensors, can be compared with the digitally mapped 3D well bore trajectory. If the BHA orientation and location is not consistent with the desired 3D well bore trajectory, then corrective action may be taken.

Preferred system 100 can also be adapted to provide an indication of the sliding motion of tubing. As explained earlier, tractor at BHA 30 tows tubing through well bore. "Lockup" often occurs when coil-tubing ceases to slide smoothly within well bore. Typically, coiled tubing begins to buckle in a wave or sinusoidal fashion. If not remedied, coiled tubing buckles helically, a much worse condition that may require substantial rework to correct. In other instances, coiled tubing may hang up on a dogleg or other restriction in the well bore. One method of obtaining an early indication of tubing "lockup" involves monitoring the coefficient of friction $\mu$ between tubing and well bore. An unexpected or dramatic change in the coefficient of friction $\mu$ may alert an operator of such conditions in the well bore. Thus, by calculating and logging the coefficient of friction, an operator has a real time or near real time method of monitoring coiled tubing integrity. Moreover, an automated safety shutdown may be included in the event that the coefficient of friction exceeds a pre-determined value.

It should be understood that the described equations and calculations are intended only to be exemplary. These equations, and accompanying descriptions, are merely intended to illustrate some considerations in deriving solutions for predicting the tension in tubular umbilical 34. One of ordinary skill in the art would readily understand the fluid and solid body mechanics associated with determining tension calculations. Moreover, one skilled in the art will appreciate that certain aspects of the described calculation may involve approximation or extrapolation of calculated or measured data.

It will also be understood that the correction method and system reflect a preferred engineering model of well bore conditions and drilling parameters. Other modeling methods utilizing different hydraulics and physics modeling may prove equally satisfactory. For example, for certain applications, it may be determined that length changes due to one or more factors such as temperature are sufficiently minimal as to be negligible. Moreover, advancements in downhole sensors may replace some calculated values with actual readings (e.g., readings for pressure differentials). Accordingly, the claims are not limited to the described modeling techniques or methodologies.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. Accordingly, the scope of protection is not limited to the embodiments described herein, but is only limited by the claims which follow, the scope of which shall include all equivalents of the subject matter of the claims.

What is claimed is:

1. A method of determining a sub-surface length of tubing injected into a borehole wherein the method comprises:

(a) recording a surface-measured length of the tubing prior to injection;

(b) determining an environmental profile; and (c) calculating the sub-surface tubing length by correcting the surface-measured tubing length to account for the environmental profile.

2. The method of claim 1 wherein the environmental profile of step (b) includes at least surface and sub-surface temperature data.

3. The method of claim 1 wherein the environmental profile of step (b) includes at least drilling fluid pressure data.

4. The method of claim 1 wherein the environmental profile of step (b) includes at least drilling fluid hydraulic flow data.

5. The method of claim 1 wherein the environmental profile of step (b) includes at least one tension force applied to the tubing.

6. The method of claim 5 wherein step (c) is accomplished by first determining the tension in the tubing and then determining the change in length due to the tension in the tubing.

7. For tubing made of material that deforms when exposed to a well bore environment, a method of determining a sub-surface length of tubing injected into a borehole, comprising:

(a) recording a surface-measured length of the tubing prior to injection;

(b) determining an environmental profile that includes a surface temperature, a well bore temperature, a hydraulic pressure and flow data for drilling fluid flowing inside the tubing, a hydraulic pressure and flow data for drilling fluid flowing outside the tubing, a tension in the tubing, and frictional forces acting on the tubing;

(c) calculating a first length change using the surface temperature, the well bore temperature, and a coefficient of thermal expansion for the tubing material at the well bore temperature;

(d) calculating a second length change using the hydraulic pressure of drilling fluid flowing inside the tubing, the hydraulic pressure of drilling fluid flowing outside the tubing, and a Poisson's Ratio and Modulus of Elasticity for the tubing material at the well bore temperature;

(e) calculating a third length change using the tension in the tubing, the surface tension, and the frictional forces acting on the tubing; and (f) establishing the sub-surface tubing length using the first, second and third length change.

8. A well construction system, comprising:

a tubing string having a terminal end;

a sensor package mounted proximate to said terminal end of said tubing string, said sensor package configured to detect well bore environmental data;

a tubing length measurement counter associated with said tubing string;

a plurality of sensors on the surface, said surface sensors configured to detect surface environmental data;

a surface processor configured to receive said well bore and surface environmental data, and a first module associated with said surface processor, said first module configured to calculate a sub-surface tubing length based on said wellbore and surface environmental data.

9. The well construction system of claim 8 wherein said sensor package includes a sensor for detecting a hydraulic pressure drop proximate to said terminal end of said tubing string.

10. The well construction system of claim 8 further comprising a tension sub adapted to read tension in said tubing string at a point proximate to said tubing terminal end.

11. A guidance system for conveying a downhole implement, comprising:
 a tubing string having a terminal end;
 a bottom hole assembly connected to said terminal end of said tubing string, said bottom hole assembly adapted to convey the downhole implement;
 a sensor package mounted proximate to said terminal end of said tubing string, said sensor package configured to detect environmental data;
 a tubing length measurement counter associated with tubing string;
 a plurality of sensors on the surface, said surface sensors configured to detect surface environmental data; and
 a surface processor configured to receive said well bore and surface environmental data, and configured to responsively determine a corrected tubing length.

12. The guidance system of claim 11 wherein said bottomhole assembly includes a tractor.

13. The guidance system of claim 12 wherein said tractor is hydraulically actuated.

14. The guidance system of claim 11 wherein said tubing comprises composite coiled tubing.

15. The guidance system of claim 14 further comprising data transmission wire embedded into said composite coiled tubing for transmitting signals from said sensor package to the surface.

16. The guidance system of claim 15 further comprising electrical power transmission wire embedded into said composite coiled tubing.

17. The system of claim 11 further comprising a casing sensor adapted to provide a indication of distance traversed in a cased portion of a borehole; and wherein said surface processor is further configured to calibrate said sub-surface tubing length with the distance indications provided by said casing sensor.

18. The system of claim 11 wherein said environmental data is selected from a group consisting of temperature, hydraulic pressure, hydraulic flow, tubing compression and tubing tension.

19. A method of determining the true length of composite coiled tubing inserted into a bore hole, the method comprising:
 storing the material properties of the composite coiled tubing, the bore hole geometry, and the tubing geometry in a memory module of a computer;
 recording a surface-measured length of the tubing prior to insertion;
 storing the surface-measured length of the tubing in a memory module of a computer;
 sensing the temperatures, pressures, and forces acting on the tubing;
 storing the temperature, pressure and force data in a memory module of a computer;
 calculating a first length correction using the stored material properties of the composite coiled tubing, the bore hole geometry, and the temperature data;
 calculating a second length correction using the stored material properties of the composite coiled tubing, the bore hole geometry, and the pressure data;
 calculating a third length correction using the stored material properties of the composite coiled tubing, the bore hole geometry, and the force data;
 determining the length of the tubing using the first, second, and third length correction.

20. The method of claim 19 wherein the material properties of the composite coiled tubing of said storing step include the Modulus of Elasticity and Poisson's ratio.

21. The method of claim 20 wherein the Modulus of Elasticity and Poisson's ratio are stored in a look-up table, the look-up table organizing the Modulus of Elasticity and Poisson's ratio with respect to temperature.

\* \* \* \* \*